United States Patent
Arsenault et al.

(10) Patent No.: US 8,675,830 B2
(45) Date of Patent: Mar. 18, 2014

(54) METHOD AND APPARATUS FOR INTERRUPTING AN ACTIVE TELEPHONY SESSION TO DELIVER INFORMATION TO A SUBSCRIBER

(75) Inventors: Jonathan Allan Arsenault, Orleans (CA); Luan Cao Tuong Nguyen, Ottawa (CA)

(73) Assignee: BCE Inc., Verdun, Québec (CA)

( * ) Notice: Subject to any disclaimer, the term of this patent is extended or adjusted under 35 U.S.C. 154(b) by 493 days.

(21) Appl. No.: 12/809,711

(22) PCT Filed: Dec. 21, 2007

(86) PCT No.: PCT/CA2007/002347
§ 371 (c)(1),
(2), (4) Date: Jun. 21, 2010

(87) PCT Pub. No.: WO2009/079736
PCT Pub. Date: Jul. 2, 2009

(65) Prior Publication Data
US 2010/0278320 A1    Nov. 4, 2010

(51) Int. Cl.
*H04M 1/64* (2006.01)
(52) U.S. Cl.
USPC .................................. 379/88.11; 455/420
(58) Field of Classification Search
USPC .............. 379/88.01–88.28, 208.01, 215.01; 455/410–413, 420
See application file for complete search history.

(56) References Cited

U.S. PATENT DOCUMENTS

| | | |
|---|---|---|
| 5,220,599 A | 6/1993 | Sasano et al. |
| 5,276,731 A | 1/1994 | Arbel et al. |
| 5,299,260 A | 3/1994 | Shaio |
| 5,329,578 A | 7/1994 | Brennan et al. |
| 5,392,342 A | 2/1995 | Rosenthal |
| 5,430,791 A | 7/1995 | Feit et al. |
| 5,465,295 A | 11/1995 | Furman |
| 5,479,496 A | 12/1995 | Endo et al. |
| 5,506,890 A | 4/1996 | Gupta et al. |
| 5,533,107 A | 7/1996 | Irwin et al. |
| 5,596,631 A | 1/1997 | Chen |
| 5,623,537 A | 4/1997 | Ensor et al. |
| 5,764,746 A * | 6/1998 | Reichelt ................ 379/210.01 |
| 5,793,859 A | 8/1998 | Matthews |
| 5,875,240 A | 2/1999 | Silverman |

(Continued)

FOREIGN PATENT DOCUMENTS

| | | |
|---|---|---|
| CA | 2533514 | 2/2005 |
| EP | 0569164 | 10/1993 |

(Continued)

OTHER PUBLICATIONS

Extended European Search Report completed on Nov. 26, 2010 in connection with European Patent Application 07 85 5626, 4 pages.

(Continued)

*Primary Examiner* — Duc Nguyen
*Assistant Examiner* — Assad Mohammed

(57) ABSTRACT

A method and apparatus for delivering information to a subscriber involved in an active telephony session is provided. A message originating from a sender and directed to the subscriber is received. Information related to the message is delivered to the subscriber by interrupting the active telephony session involving the subscriber.

48 Claims, 10 Drawing Sheets

(56) References Cited

U.S. PATENT DOCUMENTS

| | | | |
|---|---|---|---|
| 5,987,100 A | 11/1999 | Fortman et al. | |
| 5,999,613 A * | 12/1999 | Nabkel et al. | 379/215.01 |
| 6,005,870 A * | 12/1999 | Leung et al. | 370/466 |
| 6,067,349 A * | 5/2000 | Suder et al. | 379/88.19 |
| 6,134,310 A | 10/2000 | Swan et al. | |
| 6,246,871 B1 | 6/2001 | Ala-Laurila | |
| 6,295,353 B1 | 9/2001 | Flockhart et al. | |
| 6,304,573 B1 | 10/2001 | Hicks, III | |
| 6,389,117 B1 | 5/2002 | Gross et al. | |
| 6,400,808 B1 * | 6/2002 | Burg | 379/88.21 |
| 6,438,217 B1 | 8/2002 | Huna | |
| 6,529,592 B1 * | 3/2003 | Khan | 379/114.01 |
| 6,668,055 B2 | 12/2003 | Marwell et al. | |
| 6,721,397 B1 * | 4/2004 | Lu | 379/88.11 |
| 6,728,360 B1 | 4/2004 | Brennan | |
| 6,788,778 B2 | 9/2004 | Tatsumi | |
| 6,826,271 B1 | 11/2004 | Kanabar et al. | |
| 6,829,332 B2 | 12/2004 | Farris et al. | |
| 6,898,274 B1 | 5/2005 | Galt et al. | |
| 6,961,559 B1 | 11/2005 | Chow et al. | |
| 7,162,021 B1 | 1/2007 | Johnson et al. | |
| 7,269,412 B2 | 9/2007 | Bacon et al. | |
| 7,280,646 B2 | 10/2007 | Urban et al. | |
| 7,283,512 B2 * | 10/2007 | Hall, Jr. | 370/352 |
| 7,295,656 B2 | 11/2007 | Ruckart | |
| 7,388,949 B2 | 6/2008 | Contractor et al. | |
| 7,474,432 B1 | 1/2009 | Kirchhoff et al. | |
| 7,609,832 B2 | 10/2009 | Kreiner et al. | |
| 7,672,444 B2 | 3/2010 | Perrella et al. | |
| 8,023,632 B2 | 9/2011 | Gruchala | |
| 8,031,851 B2 | 10/2011 | Holt et al. | |
| 8,175,904 B2 * | 5/2012 | Templeton | 705/7.12 |
| 8,243,895 B2 | 8/2012 | Jain et al. | |
| 2002/0039407 A1 | 4/2002 | O'Donovan et al. | |
| 2002/0086662 A1 | 7/2002 | Culliss | |
| 2003/0003900 A1 | 1/2003 | Goss et al. | |
| 2003/0058839 A1 | 3/2003 | D'Souza | |
| 2003/0060210 A1 | 3/2003 | Ravishankar et al. | |
| 2004/0028026 A1 | 2/2004 | McClung et al. | |
| 2004/0095925 A1 | 5/2004 | Cody et al. | |
| 2005/0053218 A1 | 3/2005 | Kim | |
| 2005/0054335 A1 | 3/2005 | Pearson et al. | |
| 2005/0064855 A1 | 3/2005 | Russell | |
| 2005/0100155 A1 | 5/2005 | Trinkel et al. | |
| 2005/0207361 A1 | 9/2005 | Rosenberg et al. | |
| 2005/0245236 A1 * | 11/2005 | Servi et al. | 455/411 |
| 2006/0029195 A1 | 2/2006 | Mullis et al. | |
| 2006/0177033 A1 | 8/2006 | Allen et al. | |
| 2006/0190591 A1 | 8/2006 | Bobde et al. | |
| 2007/0111743 A1 * | 5/2007 | Leigh et al. | 455/518 |
| 2007/0143397 A1 | 6/2007 | Guedalia et al. | |
| 2007/0147349 A1 | 6/2007 | Bangor et al. | |
| 2007/0153991 A1 | 7/2007 | Daigle | |
| 2007/0155370 A1 | 7/2007 | Daigle | |
| 2007/0263781 A1 * | 11/2007 | Goldman et al. | 379/37 |
| 2007/0299927 A1 | 12/2007 | Knauerhase | |
| 2009/0003548 A1 | 1/2009 | Baird et al. | |
| 2009/0055502 A1 | 2/2009 | Agarwal et al. | |
| 2009/0086720 A1 | 4/2009 | Westlake | |
| 2009/0111474 A1 | 4/2009 | Hill et al. | |
| 2009/0247188 A1 | 10/2009 | Ridley et al. | |
| 2012/0106725 A1 | 5/2012 | Smith et al. | |

FOREIGN PATENT DOCUMENTS

| | | |
|---|---|---|
| EP | 1211875 | 6/2002 |
| EP | 1583341 | 10/2005 |
| EP | 1684478 | 7/2006 |
| GB | 2387737 | 1/2006 |
| JP | 2002016701 | 1/2002 |
| WO | 9107041 | 5/1991 |
| WO | 03041362 | 5/2003 |
| WO | 2006129296 | 12/2006 |
| WO | 2007033457 | 3/2007 |
| WO | 2007056824 | 5/2007 |
| WO | 2007071007 | 6/2007 |
| WO | WO2008042990 | 4/2008 |
| WO | 2008067631 | 6/2008 |
| WO | 2008077226 | 7/2008 |

OTHER PUBLICATIONS

Office Action issued on Mar. 15, 2012 in connection with U.S. Appl. No. 12/809,806, 9 pages.

Examiner's Report issued on Jun. 4, 2012 in connection with Canadian Patent Application 2,647,920, 2 pages.

Office Action issued on May 25, 2012 in connection with U.S. Appl. No. 12/673,233, 9 pages.

Supplementary European Search Report issued on May 22, 2012, in connection with European Patent Application 07855561, 6 pages.

One Voice Technologies, "Send E-mail. Voice-to-Text Messaging Solution", www.onev.com/solutions/mobile_send.asp, downloaded on Dec. 18, 2009, 2 pages.

International Search Report mailed on Aug. 21, 2008 in connection with International patent application PCT/CA2007/002323, 3 pages.

International Search Report mailed on Sep. 9, 2008 in connection with International patent application PCT/CA2007/002347, 6 pages.

Written Opinion of the International Searching Authority mailed Sep. 9, 2008 in connection with International patent application PCT/CA2007/002347, 10 pages.

International Search Report mailed on Sep. 9, 2008 in connection with International patent application PCT/CA2007/002279, 3 pages.

International Search Report mailed on Sep. 29, 2008 in connection with International patent application PCT/CA2007/002363, 4 pages.

International Search Report mailed on Sep. 17, 2008 in connection with International patent application PCT/CA2007/002346, 3 pages.

Tyson J. et al., "How VoIP Works", 2005, http://www.engedi.net/documents/HowVoIPWorks_Feb.pdf, Sep. 2008, 7 pages.

Written Opinion of the International Searching Authority mailed on Sep. 17, 2008 in connection with International patent application PCT/CA2007/002346, 6 pages.

International Search Report mailed on Sep. 19, 2008 in connection with International patent application PCT/CA2007/002364, 3 pages.

Written Opinion of the International Searching Authority mailed on Sep. 19, 2008 in connection with International patent application PCT/CA2007/002364, 4 pages.

"Google Voice", http://www.google.com/googlevoice/about.html, downloaded on Dec. 18, 2009, 1 page.

Written Opinion of the International Searching Authority mailed Aug. 21, 2008 in connection with International patent application PCT/CA2007/002323, 5 pages.

Written Opinion of the International Searching Authority mailed Sep. 9, 2008 in connection with International patent application PCT/CA2007/002279, 5 pages.

Written Opinion of the International Searching Authority mailed Sep. 29, 2008 in connection with International patent application PCT/CA2007/002363, 6 pages.

Written Opinion of the International Searching Authority mailed on Sep. 24, 2008 in connection with International patent application PCT/CA2007/002365, 5 pages.

International Search Report mailed on Sep. 24, 2008 in connection with International Patent Application PCT/CA2007/002365, 4 pages.

International Preliminary Report on Patentability completed on Apr. 15, 2010 in connection with International Patent Application PCT/CA2007/002362, 5 pages.

Office Action issued on Jan. 4, 2013 in connection with U.S. Appl. No. 12/809,407, 31 pages.

Supplementary European Search Report completed on Nov. 26, 2010 in connection with European Patent Application 07 855 626, 4 pages.

Nunn, A., "Voice Evolution", BT Technology Journal, Kluwer Academic Publishers, DO, vol. 23, No. 1, Jan. 1, 2005, pp. 120-133, XP019218795, ISSN: 1573-1995, DOI: DOI: 10.1007/S10550-005-0113-3.

Supplementary European Search Report completed on Sep. 30, 2011 in connection with European Patent 07 855 645, 7 pages.

Office Action issued on Nov. 8, 2012 in connection with U.S. Appl. No. 12/745,352, 22 pages.

(56) References Cited

OTHER PUBLICATIONS

Office Action issued on Sep. 10, 2012 in connection with U.S. Appl. No. 12/809,806, 15 pages.
Office Action issued on Oct. 5, 2012 in connection with U.S. Appl. No. 12/643,010, 9 pages.
Office Action issued on Oct. 15, 2012 in connection with U.S. Appl. No. 12/673,233, 12 pages.
Examiner's Report issued on Aug. 12, 2013 in connection with Canadian Patent Application 2,710,245, 7 pages.
Office Action issued on Aug. 15, 2013 in connection with U.S. Appl. No. 12,673,233, 11 pages.
Office Action issued on Jun. 6, 2013 in connection with U.S. Appl. No. 12/674,262, 10 pages.
Office Action issued on Jun. 18, 2013 in connection with U.S. Appl. No. 12/743,325, 9 pages.
Office Action issued on Jul. 19, 2013 in connection with U.S. Appl. No. 12/745,352, 22 pages.
Non-Final Office Action issued by the United States Patent and Trademark Office on Oct. 9, 2013 in connection with U.S. Appl. No. 12/743,980, 13 pages.
Notice of Allowance issued on Nov. 20, 2013 in connection with U.S. Appl. No. 12/674,262, 13 pages.

* cited by examiner

| Sender (caller) identification data |
|---|
| John Smith — 302a |
| 514-555-2654 — 302b |
| K. McCain — 302c |
| Office Group — 302d |
| Subscriber Group — 302e |

| Sender (caller) identification data | Interrupt Privilege Conditions |
|---|---|
| John Smith | Sender always permitted to interrupt — 304a |
| Office Group | Permitted to interrupt of Day of the week is one of {Monday, Tuesday, Wednesday, Thursday, Friday} — 304b |
| 212-234-5678 | Permitted to interrupt when the time of day is 5:00PM - 10:00PM — 304c |
| K. McCain | Permitted to interrupt of Day of the week is one of {Saturday} — 304d |
| Subscriber Group | Sender always permitted to interrupt — 304e |

| Sender (caller) identification data | Interrupt Privilege Level |
|---|---|
| John Smith | Level 1 — 306a |
| Office Group | Level 2 — 306b |
| 212-234-5678 | Level 3 — 306c |
| K. McCain | Level 3 — 306d |
| Subscriber Group | Level 1 — 306e |

| Interrupt Privilege Level | Condition to be tested |
|---|---|
| Level 1 | Sender always permitted to interrupt |
| Level 2 | Permitted to interrupt of Day of the week is one of {Monday, Tuesday, Wednesday, Thursday, Friday} |
| Level 3 | Permitted to interrupt if<br><br>1. Day of the week is one of {Monday, Tuesday, Wednesday, Thursday, Friday}<br><br>and<br><br>2. Active communication session involving the subscriber does not involve a party in the following group {Richard Smith, Family Group} |

| Sender (caller) identification data | Interrupt Privilege Password |
|---|---|
| John Smith | Not Required | — 310a
| Office Group | "5555" | — 310b
| 212-234-5678 | "1234" | — 310c
| K. McCain | "9999" | — 310d
| Subscriber Group | "1111" | — 310e

FIG. 3D

METHOD AND APPARATUS FOR INTERRUPTING AN ACTIVE TELEPHONY SESSION TO DELIVER INFORMATION TO A SUBSCRIBER

FIELD OF THE INVENTION

The present invention relates generally to telecommunications and, more particularly, to a method and an apparatus for interrupting an active telephony session to deliver information related to a message to a subscriber.

BACKGROUND

Currently, when a subscriber is on an active telephony session, such as a voice or video call, incoming calls from third parties are frequently directed to an electronic messaging service. Typically, the electronic messaging service allows the calling party to leave a message in the form of a voice mail, video message and/or text message directed to the subscriber. The messages left by the caller can then be retrieved later on by the subscriber when the latter accesses his messages in his message mailbox.

A deficiency with voice-messaging services of the type described above is that they do not provide any mechanism for delivering a message to the subscriber if the subscriber fails to access and retrieve his messages from his message mailbox. As such, time sensitive messages may not be heard on time because the subscriber does not have the time to retrieve his messages or because he may simply forget to retrieve them. For example, if a subscriber is waiting for an urgent or time sensitive voice message and this subscriber is on a call or is otherwise unavailable when the message comes in, this message will go unheard until the subscriber decides to check his message mailbox.

Against the background described above, it appears that there is a need in the industry to provide a method and apparatus for delivering messages to a subscriber that alleviates at least in part the problems associated with existing systems.

SUMMARY

In accordance with a broad aspect, the invention provides a method for delivering information to a subscriber involved in a certain active telephony session. The method comprises receiving a message originating from a sender and directed to the subscriber and causing information related to the message to be delivered to the subscriber by interrupting the certain active telephony session.

Advantageously, the above described method allows a message to be delivered to a subscriber while the subscriber is on an active telephony session, such as a telephone call or video call.

In specific examples of implementation, the information caused to be delivered to the subscriber may include audio information, video information and/or text information.

In accordance with a specific example of implementation, the method further comprises determining whether the sender is permitted to interrupt the subscriber during an active telephony session and causing information related to the message to be delivered to the subscriber during the certain active telephony session when it is determined that the sender is permitted to interrupt the subscriber during an active telephony session.

In accordance with a first specific example of implementation, wherein the message is associated to sender identification data, the method comprises processing the sender identification data to determine whether the sender is permitted to interrupt the subscriber during an active telephony session. In accordance with a specific example of implementation, the method comprises processing the sender identification data based at least in part on an interrupt privilege database to determine whether the sender is permitted to interrupt the subscriber during an active telephony session. The interrupt privilege database includes a plurality of entries, each entry being associated to at least one potential sender for allowing determining whether the at least one potential sender is permitted to interrupt the subscriber during an active telephony session. In accordance with a specific example, the interrupt privilege database includes a plurality of entries, wherein at least one of these entries is associated to a group of potential senders. The method comprises processing the sender identification data to determine whether the sender is part of the group of potential senders when determining whether the sender is permitted to interrupt the subscriber during an active telephony session. In a specific example of implementation, each entry in the plurality of entries maps at least one potential sender to a corresponding interrupt privilege level, the interrupt privilege level being selected from a set of possible interrupt privilege levels.

In accordance with a second specific example of implementation, the method comprises receiving an interrupt privilege password originating from the sender and determining whether the sender is permitted to interrupt the subscriber during an active telephony session at least in part based on the interrupt privilege password.

In a specific example, the interrupt privilege database is defined at least in part by the subscriber. Advantageously, by allowing the subscriber to define at least some entries in the interrupt privilege database, the subscriber is given flexibility in specifying under which circumstance the subscriber can be interrupted during an active telephony session.

In accordance with a specific example of implementation, wherein the message is a text message, the method comprises receiving a text message directed to the subscriber and processing the text message to generate audio information related to the text message. The method also comprises causing the audio information related to the message to be delivered to the subscriber by interrupting the certain active telephony session.

In accordance with a specific example of implementation, the method comprises causing information related to the message to be delivered to the subscriber during the certain active telephony session by:
  disconnecting from the certain active telephony session a communication device involved in the certain active telephony session, the communication device being associated with the subscriber;
  delivering the information related to the message to the subscriber through the communication device;
  reconnecting the communication device to the certain active telephony session.

In accordance with a alternative specific example of implementation, the method comprises causing information related to the message to be delivered to the subscriber during the certain active telephony session by bridging a message delivery system into the certain active telephony session, more specifically by bridging the information related to the message into the certain active telephony session.

In accordance with a specific example of implementation, wherein the certain active telephony session involves the subscriber and at least one other participant, the method comprises muting the at least one other participant when the information related to the message is bridged into the certain active telephony session.

In accordance with a specific example of implementation, the message is a voice message and the sender is a caller. The method comprises allowing the caller to record a voice message directed to the subscriber and associating caller identification data to the voice message. In a first specific example of implementation, the information delivered to the subscriber during the active telephony session involving the subscriber indicates that there is a voice message for the subscriber. In a second specific example of implementation, the information delivered to the subscriber during the active telephony session involving the subscriber is an audio representation of at least part of the voice message itself.

In specific examples of implementation, the active telephony session is any type of active telephony session made over a communication network and involving the subscriber. Examples of active telephony sessions include, without being limited to, an active voice call, an active video call and a multimedia call.

In accordance with a specific example of implementation, the information related to the message is delivered to the subscriber during an active telephony session involving the subscriber without being conveyed to another party involved in the active telephony session.

In accordance with another specific example of implementation, the subscriber is member of a certain subscriber group and the method comprises processing the sender identification data to determine whether the sender is member of the same certain subscriber group. The method also comprises determining whether the sender is permitted to interrupt the subscriber during an active telephony session at least in part based on whether the sender is member of the certain subscriber group.

In accordance with another broad aspect, the invention provides an apparatus for delivering information to a subscriber involved in a certain active telephony session. The apparatus comprises a first interface suitable for receiving a message originating from a sender and directed to the subscriber and a second interface suitable for communicating with a communication device associated with the subscriber, the communication device being involved in the certain active telephony session. The apparatus also comprises a processing unit in communication with the first interface and the second interface programmed for delivering information to the subscriber in accordance with the above-described method.

In accordance with another broad aspect, the invention provides a computer readable storage medium including a program element suitable for execution by a computing apparatus for delivering information to a subscriber involved in a certain active telephony session. The computing apparatus comprises a memory unit and a processor in communication with the memory unit. The program element when executing on the processor is operative for delivering information to the subscriber in accordance with the above-described method.

In accordance with another broad aspect, the invention provides an apparatus for delivering information to a subscriber involved in a certain active telephony session. The apparatus comprises means for receiving a message originating from a sender and directed to the subscriber and means for communicating with a communication device associated with the subscriber, the communication device being involved in the certain active telephony session. The apparatus also comprises means for delivering information to the subscriber in accordance with the above-described method.

In accordance with another broad aspect, the invention provides a method for delivering information to a subscriber. The method comprises receiving a message originating from a sender and intended for the subscriber and determining whether the subscriber is involved in an active telephony session. Upon determination that the subscriber is involved in an active telephony session, the method comprises causing information related to the message to be delivered to the subscriber by interrupting the active telephony session in which the subscriber is involved.

In accordance with a specific example of implementation, in the absence of an active telephony session involving the subscriber, the method comprises causing information related to the message to be delivered to the subscriber in response to detection of an off-hook condition in connection with a communication device associated with the subscriber.

In accordance with a specific example of implementation, the method comprises determining whether the sender is permitted to interrupt the subscriber during an active telephony session. In the absence of an active telephony session involving the subscriber, the method comprising causing information related to the message to be delivered to the subscriber when both:
  i) an off-hook condition is detected in connection with a communication device associated with the subscriber; and
  ii) it is determined that the sender is permitted to interrupt the subscriber during an active telephony session.

In accordance with another broad aspect, the invention provides an apparatus for delivering information to a subscriber. The apparatus comprises a first interface suitable for receiving a message originating from a sender and directed to the subscriber and a second interface for communicating with a communication device associated with the subscriber. The apparatus also comprises a processing unit in communication with the first interface and the second interface programmed for delivering information to the subscriber in accordance with the above-described method.

In accordance with another broad aspect, the invention provides a computer readable storage medium including a program element suitable for execution by a computing apparatus for delivering information to a subscriber. The computing apparatus comprises a memory unit and a processor in communication with the memory unit. The program element when executing on the processor is operative for delivering information to the subscriber in accordance with the above-described method.

In accordance with another broad aspect, the invention provides an apparatus for delivering information to a subscriber. The apparatus comprises means for receiving a message originating from a sender and directed to the subscriber and means for communicating with a communication device associated with the subscriber. The apparatus also comprises means for delivering information to the subscriber in accordance with the above-described method.

In accordance with another broad aspect, the invention provides a computer readable storage medium storing an interrupt privilege database suitable for use by a message delivery system for determining whether a sender of a message is permitted to interrupt a subscriber during an active telephony session. The interrupt privilege database includes a plurality of entries, at least some entries in the plurality of entries being defined by the subscriber. Each entry in the database is associated to one or more potential senders for allowing determining whether the one or more potential senders are permitted to interrupt the subscriber during an active telephony session.

These and other aspects of the invention will become apparent to those of ordinary skill in the art upon review of the following description of example embodiments of the invention in conjunction with the accompanying drawings.

BRIEF DESCRIPTION OF THE DRAWINGS

A detailed description of example embodiments of the present invention is provided herein below, by way of example only, with reference to the accompanying drawings, in which:

FIG. 3A shows a first example of potential contents of an interrupt privilege database in accordance with an embodiment of the invention;

FIG. 3B shows a second example of potential contents of an interrupt privilege database in accordance with an embodiment of the invention;

FIG. 3C shows a third example of potential contents of an interrupt privilege database in accordance with an embodiment of the invention;

FIG. 3D shows a fourth example of potential contents of an interrupt privilege database in accordance with an embodiment of the invention;

It is to be expressly understood that the description and drawings are only for the purpose of illustration of certain embodiments of the invention and are an aid for understanding. They are not intended to be a definition of the limits of the invention.

DETAILED DESCRIPTION

Figure 1:
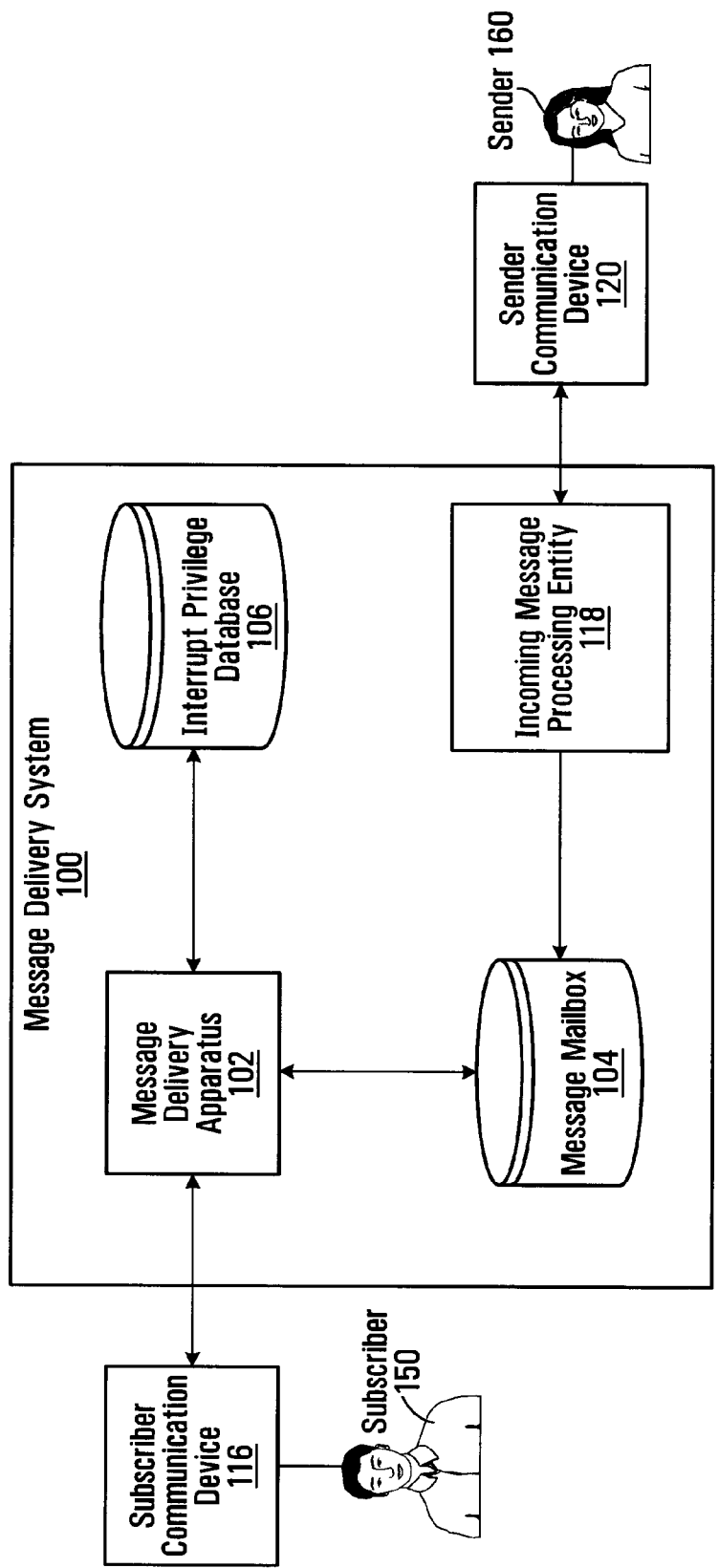
FIG. 1 shows a message delivery system for delivering information to a subscriber in accordance with an embodiment of the invention.

FIG. 1 illustrates a message delivery system 100 providing a priority electronic message delivery service. As shown, the message delivery system 100 includes a message delivery apparatus 102, an interrupt privilege database 106, a message mailbox 104 and an incoming message processing entity 118. In FIG. 1, the message delivery system 100 is in communication with a subscriber communication device 116 for delivering information thereto in accordance with the method and variants thereof described later on in the present specification.

The subscriber communication device 116 may be embodied in any suitable device allowing a user to effect telephonic communications, including receiving an incoming call originating from a calling party device, originating an outgoing call destined for a called party device, participating in a call (voice or video) in progress and (optionally) sending a text message. For example, in various embodiments, the subscriber communication device 116 may be a wired Plain Old Telephony System (POTS) phone (including a cordless phone), a wireless phone (e.g., a cellular phone or other mobile communication device, including a telephony-enabled personal digital assistant (PDA)), a Voice-over-Internet Protocol (VoIP) phone, a POTS phone equipped with an analog terminal adapter (ATA), a soft phone (i.e., a computer equipped with telephony software), or a telephony-enabled television unit (e.g., a set-top box connected to a television and a remote control). Depending on functionality of the subscriber communication device 116, an active telephony session involving the subscriber 150 may be a voice call, a video call, a multimedia call or another type of call.

Although in the example depicted, the subscriber 150 is associated to a single subscriber communication device 116, the subscriber 150 may be associated to multiple communication devices in alternate examples of implementation. In such alternate examples of implementation, the message delivery system 100 is in communication with these multiple subscriber communication devices for delivering information thereto in accordance with the methods and variants thereof described later on in the present specification.

In FIG. 1, the message delivery system 100 is also shown in communication with a sender communication device 120 for receiving therefrom messages directed to the subscriber 150.

The sender communication device 120 may be any suitable device allowing a user (sender) 160 to effect telephonic communications, including receiving an incoming call originating from a calling party device, originating an outgoing call destined for a called party device, participating in a call (voice or video) in progress, (optionally) sending a text message (e.g., a Short Message Service (SMS) message), a multimedia message (e.g., a Multimedia Message Service (MMS) message), an instant messaging (IM) message) and (optionally) sending an e-mail.

The components of the message delivery system 100 and their functionality will now be described in greater detail.

Message Mailbox 104

Figure 2:
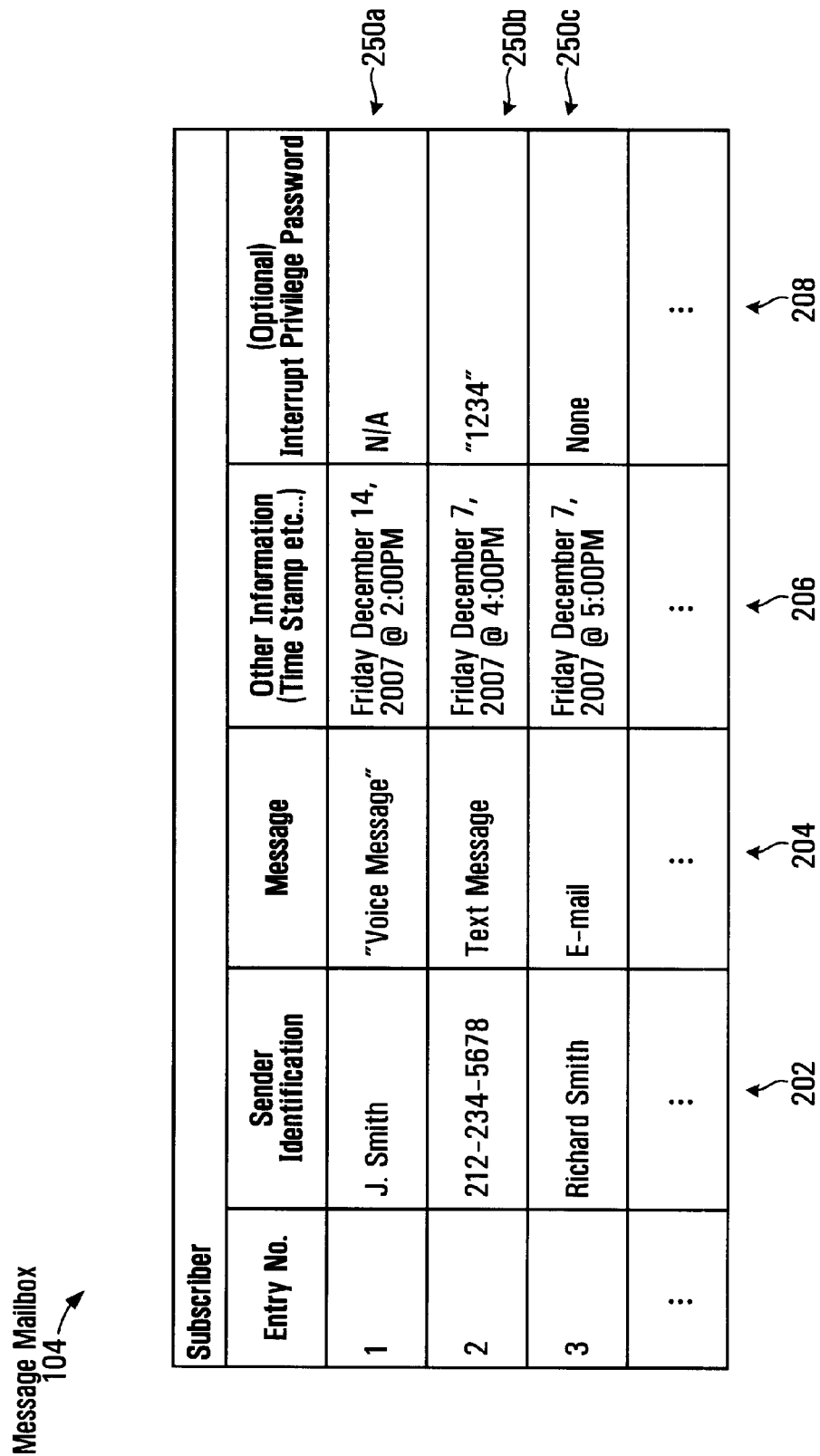
FIG. 2 shows an example of potential contents of a message mailbox in accordance with an embodiment of the invention.

The message mailbox 104 includes a memory for storing messages directed to the subscriber 150 of the priority electronic message delivery service provided by the message delivery system 100. The specific format in which messages are stored in the message mailbox 104 is not critical to the invention and many variants are possible. FIG. 2 of the drawings is a conceptual illustration of a non-limiting example of a message mailbox 104 associated to subscriber 150. As shown, message mailbox 104 includes a plurality of entries 250a-c, each entry being associated to a respective message directed to subscriber 150. The message 204 may be an electronic message (e.g., an electronic mail (email) message, a text message (e.g., a Short Message Service (SMS) message), a multimedia message (e.g., a Multimedia Message Service (MMS) message), an instant messaging (IM) message), a voice message or a video message. In the example shown, each entry in the message mailbox 104 includes a message field 204, sender identification data field 202 identifying the sender of the message 204 and (optionally) a description information field 206 for providing information related to the message such as date/time information message type and/or other suitable information.

In cases where the message is a voice message, the sender may also be referred to as a caller. In such a case the sender identification data field 202 may store caller identification data, which may be in the form of a caller name, telephone number or other suitable identifier associated with the caller.

Optionally, as shown in FIG. 2, each entry in the message mailbox 104 includes an interrupt privilege password field 208 for storing an interrupt privilege password provided by the sender of the message. Examples of the manner in which the sender of a message may provide the interrupt privilege password will be described later on in the specification.

Optionally, not shown in the figures, each entry in the message mailbox 104 includes a priority message indication field indicating whether or not the sender intended the message to be delivered to the subscriber by interrupting an active telephony session. When the priority message indication field indicates that the sender intended the message to be delivered to the subscriber by interrupting an active telephony session, the message is referred to as a "priority message". Conversely, when the priority message indication field indicates that the sender did not intend the message to be delivered to the subscriber by interrupting an active telephony session, the message is referred to as a "non-priority message".

Alternatively, message mailbox 104 stores only "priority messages" and a separate message mailbox (not shown in the figures) is provided for storing "non-priority messages". In such an alternative implementation, entries in the message mailbox 104 are processed when providing the priority electronic message delivery service while entries in the message mailbox (not shown) storing the "non-priority messages" are processed when providing the conventional mail delivery service.

It is to be appreciated that the above-described examples of contents of the message mailbox 104 were presented for the purposes of illustration and that many other variants are possible without detracting from the spirit of the invention.

Interrupt Privilege Database 106

Reverting to FIG. 1, the interrupt privilege database 106 includes a memory unit for storing information related to one or more conditions. These conditions are used by the message delivery apparatus 102 for determining whether a given message in the message mailbox 104 should be delivered to the subscriber 150 through subscriber communication device 116 prior to the subscriber proactively retrieving his messages from his message mailbox 104.

In a specific example, the interrupt privilege database 106 stores information for allowing the message delivery apparatus 102 to determine, for a given message in the message mailbox 104, whether the sender of the message is permitted to interrupt the subscriber during an active telephony session.

The interrupt privilege database 106 may be subscriber specific or may be shared by a group of subscribers of the priority electronic message delivery service.

In cases where the interrupt privilege database 106 is subscriber specific, at least some of the conditions for determining whether a given message in the message mailbox 104 should be delivered are tailored to the subscriber 150. This tailoring of the interrupt privilege database 106 can be done by allowing the subscriber 150 to specify conditions/situations in which messages in the message mailbox 104 should be delivered. Any suitable manner for enabling the subscriber to specify such conditions/situations may be used. In a specific example of implementation, an "interruption configuration function" accessible by the subscriber 150 is provided either by the message delivery apparatus 102 or by another entity (not shown), this function allowing the subscriber to enter and/or modify conditions in the interrupt privilege database 106. The "interruption configuration function" may be accessible by the subscriber 150 through any suitable mechanism including for example the subscriber communication device 116 or some other suitable electronic interface such as, for example, a web-based interface.

In cases where the interrupt privilege database 106 is shared by a group of subscribers of the priority electronic message delivery service, the interrupt privilege database 106 includes a set of conditions for determining whether the sender of a message is permitted to interrupt the subscriber 150 during an active telephony session. In a first non-limiting example, the group of subscribers includes all employees in a company, say company ABC INC., and a condition in the interrupt privilege database 106 may specify that messages originating from the General Manager are permitted to interrupt the subscribers in this group during active telephony sessions. In such an implementation, an administrator of the priority electronic message delivery service, or another person having administrator privileges for the priority electronic message delivery service, would specify this condition during a configuration process of the interrupt privilege database 106. In a second non-limiting example, the group of subscribers includes all members of a family, say Mr. Smith's family which may include Mr. Smith, Mrs. Smith, Junior Smith and Little-Girl Smith. A condition in the interrupt privilege database 106 may specify that messages originating from either Mr. Smith or Mrs. Smith are permitted to interrupt any of the subscribers in this group during active telephony sessions. In such an implementation, a person having administrator privileges for this service, such as Mr. Smith and/or Mrs. Smith, would specify this condition during a configuration process of the interrupt privilege database 106. Any suitable manner for enabling an administrator of the message delivery service to specify the conditions to be tested may be used. In a specific example of implementation, an "interruption configuration function" accessible by an administrator of the message delivery service is provided either by the message delivery apparatus 102 or by another entity (not shown), this function allowing the administrator of the message delivery service to enter and/or modify conditions in the interrupt privilege database 106. The "interruption configuration function" may be accessible by an administrator of the message delivery service through any suitable mechanism including for example the subscriber communication device 116 or some other suitable electronic interface including for example a web-based interface.

In a specific example, the interrupt privilege database 106 includes a set of entries, each entry being associated to one or more potential senders for allowing determining whether the one or more potential senders are permitted to interrupt the subscriber during an active telephony session. Several different embodiments of the interrupt privilege database 106 are possible. FIGS. 3A, 3B, 3C and 3D of the drawings are conceptual illustrations of specific examples of implementation of the contents of the interrupt privilege database 106. For the reader's ease of reference, the specific examples of implementation of the contents of the interrupt privilege database 106 shown in FIGS. 3A, 3B, 3C and 3D have been assigned reference numerals 106A 106B 106C and 106D respectively.

In FIG. 3A, a first example of an interrupt privilege database 106A is shown in simplified form. In this example, the interrupt privilege database 106A includes a plurality of entries 302a-e each entry including sender identification data associated with one or more potential senders of messages. In this example, a condition for determining whether a given message should be delivered to the subscriber may be specified as follows:

if the given message originates from a sender corresponding to any of the entries 302a-e, then the sender is permitted to interrupt the subscriber during an active telephony session.

if the given message originates from a sender that does not correspond to any of the entries 302a-e, then the sender is not permitted to interrupt the subscriber during an active telephony session.

In the example depicted in FIG. 3A, the reader will note that entries 302d and 302e are associated to respective groups of potential senders, namely an "Office Group" and a "Subscriber Group". Although a group of potential senders may include a single potential sender, a group of potential senders will generally include two or more potential senders. The members of a group may be defined by the subscriber or by another party authorized to create groups on behalf of the subscriber.

In FIG. 3B, a second example of an interrupt privilege database 106B is shown in simplified form. In this alternative implementation, the interrupt privilege database includes a set of entries, at least some entries mapping a potential sender or group of senders to one or more conditions that must be tested to determine whether an active telephony session involving the subscriber can be interrupted. In the example depicted in FIG. 3B, a plurality of entries 304a-e are provided, each entry including sender identification data associated with one or more potential senders of messages. Each entry specifies certain conditions that must be tested when determining whether the sender or senders associated with the entry is/are permitted to interrupt an active telephony session involving the subscriber. In this example, a condition for determining whether a given message should be delivered to the subscriber may be specified as follows:

if the given message originates from a sender corresponding to any of the entries 304a-e, then the sender is permitted to interrupt the subscriber during an active telephony session only if the condition(s) associated with the entry corresponding to the sender is(are) satisfied;

if the given message originates from a sender that does not correspond to any of the entries 304a-e, then the sender is not permitted to interrupt the subscriber during an active telephony session.

Advantageously, the example shown in FIG. 3B allows different conditions to be tested depending on the identity of the sender, which therefore provides the subscriber with a level of flexibility in determining under which circumstances an active telephony session can be interrupted to deliver a message. In the example shown in FIG. 3B, different circumstances can be taken into account for different senders.

In FIG. 3C, a third example of an interrupt privilege database 106C is shown in simplified form. This example is similar to the example depicted in FIG. 3B in that a plurality of entries 306a-e is provided, each entry being associated to one or more potential senders. In the example depicted in FIG. 3C, each entry is associated to a respective level of interrupt privilege where the respective level of interrupt privilege is selected from a set of possible levels of interrupt privilege, namely Level 1, Level 2 and Level 3. At least some levels of interrupt privilege in the set of possible levels of interrupt privileges are associated with one or more conditions that are to be tested to determine whether interruption of an active telephony session to deliver a message is to take place. In the example shown in FIG. 3C, examples of the conditions associated with each level of interrupt privilege are provided. More specifically, a "Level 1" interrupt privilege specifies that messages originating from senders associated to this privilege level are always permitted to interrupt active telephony sessions. A "Level 2" interrupt privilege specifies that messages originating from senders associated to this privilege level are permitted to interrupt active telephony sessions subject to a second condition, namely the day of week. This allows for example to specify that messages originating from the "Office Group" are permitted to interrupt active telephony sessions during weekdays but not otherwise. A "Level 3" interrupt privilege specifies that messages originating from senders associated to this privilege level are permitted to interrupt active telephony sessions subject to two different conditions, namely the day of week and the identity of a party other than the subscriber involved in the active telephony session.

In FIG. 3D, a fourth example of an interrupt privilege database 106D is shown in simplified form. In this example, the interrupt privilege database 106D includes a plurality of entries 310a-e each entry including sender identification data associated with one or more potential senders of messages. Some entries, labeled as entries 310b 310c 310d and 310e in FIG. 3D, include an interrupt privilege password. In this example, a condition for determining whether a given message should be delivered to the subscriber may be specified as follows:

if the given message originates from a sender corresponding to any of the entries 310a-e, then the sender is permitted to interrupt the subscriber during an active telephony session only if the sender provides a password corresponding to the interrupt privilege password in the database 106D;

if the given message originates from a sender that does not correspond to any of the entries 310a-e, then the sender is not permitted to interrupt the subscriber during an active telephony session.

In the example shown in FIG. 3D, the potential senders in the database are provided with respective interrupt privilege passwords. It will be appreciated that certain senders may be exempt from having to provide an interrupt privilege password while others are not. This may be the case, for example, if the sender is an authorized administrator for a group of subscribers (for example the head of a household, an office manager etc. . . . ). In the example shown in FIG. 3D, sender "John Smith" in entry 310a is not required to provide an interrupt privilege password. Although the examples provided have shown the interrupt privilege passwords to be in the form of a sequence of digits, it is to be appreciated that other formats for the interrupt privilege password are possible without detracting from the spirit of the invention. Such other formats may include, without being limited to, a voiceprint, an alphanumeric sequence of characters and any other suitable format.

In yet another alternative example of implementation (not shown in the figures), the interrupt privilege database 106 stores an interrupt privilege password common for all potential senders of messages. In this example, a condition for determining whether a given message should be delivered to the subscriber may be specified as follows:

if the sender provides a password corresponding to the interrupt privilege password in the database 106, then the sender is permitted to interrupt the subscriber during an active telephony session;

if the sender does not provide a password corresponding to the interrupt privilege password in the database 106, then the sender is not permitted to interrupt the subscriber during an active telephony session.

An advantage of making use of an interrupt privilege password, whether the interrupt privilege password is common for all potential senders or whether the interrupt privilege password is sender specific, is that it allows a sender having knowledge of the interrupt privilege password to have the option of:

making use of the password such as to interrupt an active communication involving the subscriber when sending a time sensitive message;

not making use of the password and leaving a message in the usual fashion (i.e. not interrupting an active communication involving the subscriber) when sending a message that is less time sensitive.

It is to be appreciated that the above-described examples of contents of the interrupt privilege database 106 were presented for the purposes of illustration and that many other variants are possible without detracting from the spirit of the invention.

It is to be appreciated that the interrupt privilege database 106 does not need to be a database dedicated to the priority electronic message delivery service provided by message delivery system 100. For instance, the interrupt privilege database 106 may be embodied as a general purpose electronic phone/address book associated to the subscriber 150, where the general purpose electronic phone/address book may be used by various communication services in addition to the priority electronic message delivery service provided by message delivery system 100.

In addition, it is to be appreciated that certain implementations may omit the interrupt privilege database 106. For instance, the interrupt privilege database 106 may be omitted in cases where it is desirable for information related to a message to be delivered to the subscriber by interrupting an active telephony session involving the subscriber irrespective of the sender from which the message originates and/or irrespective of any other circumstance.

Message Delivery Apparatus 102

Returning once again to FIG. 1, the message delivery apparatus 102 implements the required functionality for delivering information conveying a message to the subscriber 150.

Advantageously, the message delivery apparatus 102 enables the subscriber 150 to receive messages or information related thereto either while the subscriber is on an active telephony session or after detection of an off-hook condition in connection with the subscriber communication device 116. The message delivery apparatus 102 therefore enables a message to be delivered to the subscriber without requiring that the subscriber proactively access his voicemail service.

In a specific example of implementation, the message delivery apparatus 102 implements the required functionality for processing a message from the message mailbox 104 to determine whether the sender of that message is permitted to interrupt the subscriber when the latter is on an active telephony session. Examples of the manner in which the message delivery apparatus 102 may determine whether the sender of the message is permitted to interrupt the subscriber 150 are described later on in the specification.

Optionally, the message delivery apparatus 102 also implements the required functionality for delivering messages to the subscriber 150 for allowing the subscriber to proactively retrieve his messages from the message mailbox 104. The functionality related to this aspect, namely that of delivering messages to the subscriber 150 when the subscriber proactively retrieves his messages from the message mailbox 104, can be implemented according to any suitable well-known method. These methods are not critical to the present invention and as such will not be described further here.

Figure 4:
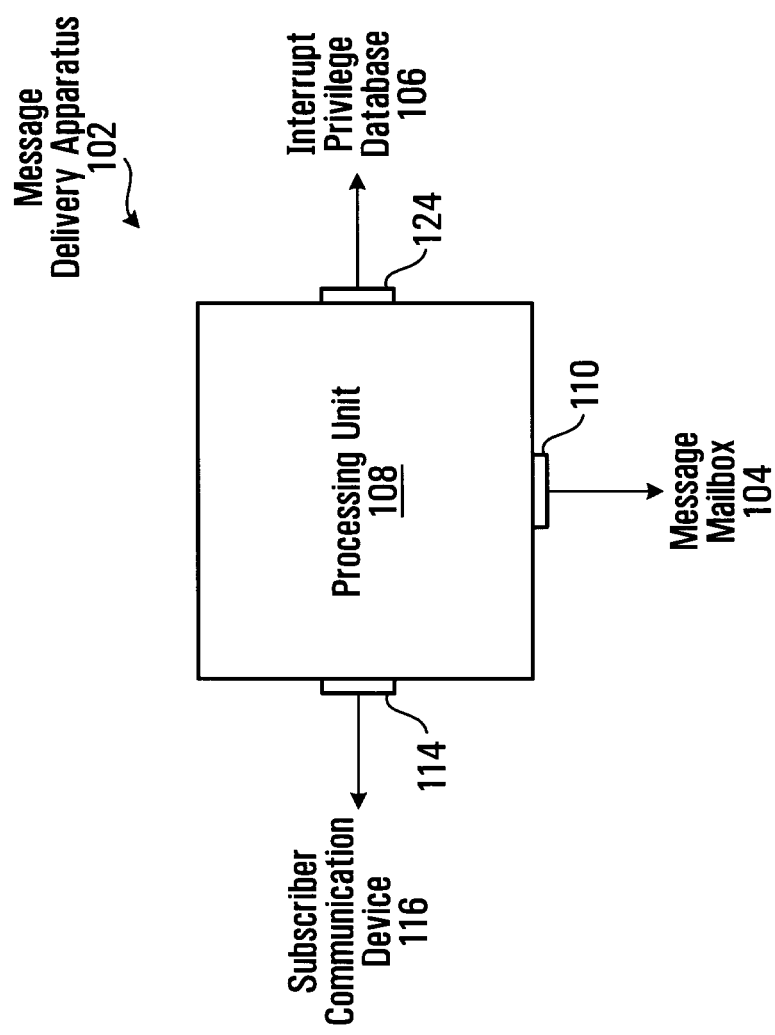
FIG. 4 shows a message delivery apparatus suitable for use in the message delivery system of FIG. 1 in accordance with an embodiment of the invention.

A specific example of implementation of the message delivery apparatus 102 will now be described with reference to FIG. 4.

As shown, the message delivery apparatus 102 includes a first interface 110, a second interface 114, a third interface 124 and a processing unit 108. The first interface 110 is in communication with message mailbox 104 and is for receiving a notification that a message directed to the subscriber 150 was received in voice mailbox 104. The second interface 114 is for communicating with a communication device associated with the subscriber, such as communication device 116. Although the second interface 114 has been shown for the purpose of simplicity as being in direct communication with the communication device 116, it should be appreciated that the communication between the second interface 114 and communication device 116 may be made over a communication network. Hence in such circumstances, the communication path between the second interface 114 and communication device 116 may include various network routing components. The third interface 124 is for communication with the interrupt privilege database 106.

The processing unit 108 is in communication with the first interface 110, the second interface 114 and third interface 124 and is programmed with the required functionality for delivering information related to a message to the subscriber by interrupting an active telephony session involving the subscriber. In a specific example of implementation, the delivery of information to the subscriber by interrupting an active telephony session involving the subscriber depends on the conditions specified in the interrupt privilege database 106.

The process implemented by the message delivery apparatus 102 in accordance with a specific example of implementation of the invention will now be described with reference to FIGS. 4 and 5.

At step 400, the processing unit 108 receives a notification that a message directed to the subscriber 150 was received in voice mailbox 104. In a specific example of implementation, step 400 is initiated when a new message is received by the message mailbox 104. In implementations where the entries in the message mailbox 104 include a priority message indication field indicating whether or not the sender intended the message to be delivered to the subscriber by interrupting an active telephony session, the processing unit 108 proceeds to step 401. Otherwise, in implementations where the entries in the message mailbox 104 do not include a priority message indication field, the processing unit 108 skips step 401 and proceeds to step 402.

At step 401, the information in the priority message indication field is taken into account to determine whether the message should be delivered to the subscriber by interrupting an active telephony session. More specifically, if at step 401, the processing unit 108 determines that, based on the priority message indication field associated with the message, the sender did not intend to interrupt an active telephony session to deliver the message, the processing unit 108 proceeds to step 404. If at step 402, the processing unit 108 determines that, based on the priority message indication field associated with the message, the sender intended to interrupt an active telephony session to deliver the message, the processing unit 108 proceeds to step 402.

At step 402, the processing unit 108 determines whether the sender associated with the message received in the message mailbox 104 is permitted to interrupt the subscriber during an active telephony session. In a specific example of implementation, step 402 applies conditions specified in the interrupt privilege database 106 to determine whether the sender of the message is permitted to interrupt the subscriber during an active telephony session.

If at step 402, the processing unit 108 determines that the sender of the message is not permitted to interrupt the subscriber during an active telephony session, the processing unit 108 proceeds to step 404. If at step 402, the processing unit 108 determines that the sender of the message is permitted to interrupt the subscriber during an active telephony session, the processing unit 108 proceeds to step 406. It will be appreciated that, in implementations where the interrupt privilege database 106 is omitted and/or where it is desirable for information related to a message to be delivered to the subscriber by interrupting an active telephony session involving the subscriber irrespective of the circumstances surrounding the message, step 402 may be omitted. In such implementations, processing unit 108 would proceed directly from step 400 (or step 401) to step 406.

At step 404, the message for which a notification is received at step 400 is processed in accordance with usual message handling procedures. In a specific example, the message for which a notification is received at step 400 is delivered to the subscriber the next time the subscriber proactively accesses his voice messages.

A step 406, which is initiated when the processing unit 108 determines at step 402 that the sender is permitted to interrupt the subscriber during an active telephony session, a determination is made as to whether the subscriber is on an active telephony session. Depending on the type of subscriber communication device 116 (shown in FIG. 1), an active telephony session involving the subscriber may be a voice call, a video call, a multimedia call or any similar other type of telephony session.

In the specific example shown in FIG. 1, where the subscriber 150 is associated to a single communication device 116, a determination is made as to whether this single communication device 116 is engaged in an active telephony session. If step 406 determines that the single communication device associate with the subscriber is not engaged in an active telephony session, the system proceeds to step 408. Otherwise, if step 406 determines that the single communication device 116 is engaged in an active telephony session, the system proceeds to step 410.

In an alternate example where the subscriber is associated to multiple communication devices, at step 406 a determination is made as to whether any one of these multiple communication devices is engaged in an active telephony session. If step 406 determines that none of the multiple communication devices associated with the subscriber is engaged in an active telephony session, the system proceeds to step 408. Otherwise, if step 406 determines that at least one of the multiple communication devices associated with the subscriber is engaged in an active telephony session, the system proceeds to step 410.

The specific manner in which the processing unit 108 determines whether the one or more communication devices associated with the subscriber are engaged in an active telephony session is not critical to the invention. As such, any suitable method for determining whether the one or more communication devices associated with the subscriber are engaged in an active telephony session may be used. Such methods are well known in the field of telephony and as such will not be described further here.

At step 408, which is initiated when step 406 determines that the subscriber is not on an active telephony session, the message is handled in accordance with a priority handling process. Different embodiments may implement the priority handling process in different manners.

In a specific example, in the absence of an active telephony session involving the subscriber, the priority handling process includes delivering information related to the message to the subscriber in response to detection of an off-hook condition in connection with a communication device associated with the subscriber. In such an implementation, the message is placed in a queue and the processing unit 108 then monitors the one or more communication devices associated to the subscriber for detection on off-hook condition associated with any one of these devices. In response to detection of an off-hook condition, the processing unit 108 causes information related to the message to be delivered to the subscriber via the device associated with the off-hook condition.

As will be appreciated by the person skilled in the art, an off-hook condition may occur in connection with a communication device when the communication device is taken off-hook to initiate a telephony session. When that is the case, the process described above can be used to deliver the information related to the message to the subscriber via the communication device associated with the off-hook condition. It will also be appreciated that an off-hook condition may occur in connection with a communication device when the communication device is taken off-hook to answer an inbound call. If the subscriber receives an inbound call before attempting to make an outbound call, then processing unit 108 could for example:

interrupt the incoming call and deliver information related to the message (in a manner similar to that which will be described with reference to step 410); or
 wait until the next off-hook condition when the communication device is taken off-hook to initiate a telephony session.

In another specific example (not shown in the figures), in the absence of an active telephony session involving the subscriber, the message received by the message mailbox 104 is handled in accordance with usual well-known message handling procedures. In a specific example, the message is delivered to the subscriber the next time the subscriber retrieves his messages from the message mailbox 104.

At step 410, which is initiated when the processing unit 108 determines at step 406 that the subscriber is on an active telephony session, the processing unit 108 delivers information related to the message the subscriber by interrupting the active telephony session involving the subscriber.

In a specific example of implementation, the information related to the message is delivered to the subscriber through at least one communication device associated with the subscriber. If the subscriber is associated to a single communication device, as shown in the example depicted in FIG. 1, the processing unit 108 interrupts the communication session to deliver the information related to the message to the subscriber 150 through that single communication device 116. If the subscriber is associated to more than one communication device where a certain one of the communication devices is involved in the active telephony session, the processing unit 108 interrupts the communication session to deliver the information related to the message to the subscriber 150 through the certain one communication device. Optionally, in a situation where two or more communication devices associated with the subscriber are engaged in multiple active telephony sessions, the processing unit 108 interrupts the multiple active communication sessions to deliver the information related to the message to the subscriber 150 through the two or more communication devices engaged in the multiple active telephony sessions.

Preferably, when information related to the message is delivered to the subscriber by interrupting an active telephony session involving the subscriber, it is delivered to the subscriber without being conveyed to another party involved in the active telephony session. In a specific example, when the active communication is a voice call between the subscriber and another party and the information related to the message is in the form of audio information, the processing unit 108 synthesizes audio information related to the message only on the subscriber end of the telephony session so that the other party does not hear the audio information being delivered. Advantageously, this allows maintaining the privacy of messages directed to the subscriber. It will however be appreciated that, in certain implementations, the processing unit 108 may deliver the audio information in such a way as to be heard by the subscriber and by other parties involved in the active telephony session.

The contents and/or composition of the information delivered to the subscriber may vary from one implementation to the other and may depend on the format of the message itself.

In a first example, the information related to the message indicates that there is a message for the subscriber. The information may also indicate various characteristics of the message such as, for example:

the identity of the sender;

the time the message was sent and/or received;

if the message was a voice call, the originating phone number;

if the message was an e-mail message, the originating e-mail address or server name;

and/or any other suitable information that may be useful to the subscriber.

In a non-limiting example, information of the following format may be considered: "You have a voice message from J. Smith received at 2:00 PM".

In a variant of the above first example, in addition to providing information conveying that there is a message for the subscriber, the subscriber is provided with an option for causing an audio representation of the message to be delivered to the subscriber. In a non-limiting example, information of the following format may be considered: "You have a voice message from J. Smith received at 2:00 PM. To listen to this message, press 1 now.". If the subscriber enter "1" on his communication device, the voice message is delivered to the subscriber. As will be appreciated, in cases whether the message is a video message, the above-described example could be modified by providing the subscriber an option for causing a video representation of the message to be delivered to the subscriber. In a non-limiting example, information of the following format may be considered: "You have a video message from J. Smith received at 2:00 PM. To view to this message, press 1 now.".

In a second example, the information delivered to the subscriber by interrupting the active telephony session involving the subscriber is an audio or video representation of the message. More specifically, in a practical example where the message from the sender is a voice message, the processing unit 108 delivers an audio representation of the voice message. In an alternative practical example where the message is a text message, the processing unit 108 implements suitable text-to-speech functionality for delivering to the subscriber an audio synthesized representation of the text message. In another practical example where the message from the sender is a video message, the processing unit 108 delivers a video representation of the video message.

Optionally, once the information related to the message is delivered to the subscriber at step 410, the processing unit 108 may automatically delete the message from message mailbox 104. Alternatively, the message may remain in message mailbox 104 so that it may be retrieved therefrom at a later time by the subscriber in a manner similar to that of conventional voicemail.

Optionally still, in implementations where message mailbox 104 stores only "priority messages" and a separate message mailbox (not shown in the figures) is provided for storing "non-priority messages", the processing unit 108 may automatically delete the message from message mailbox 104 and store a copy of the message in the message mailbox storing the "non-priority messages". In such a manner, the message may be retrieved at a later time by the subscriber in a manner similar to that of conventional voicemail along with the other messages in the message mailbox storing "non-priority messages".

Figure 5:
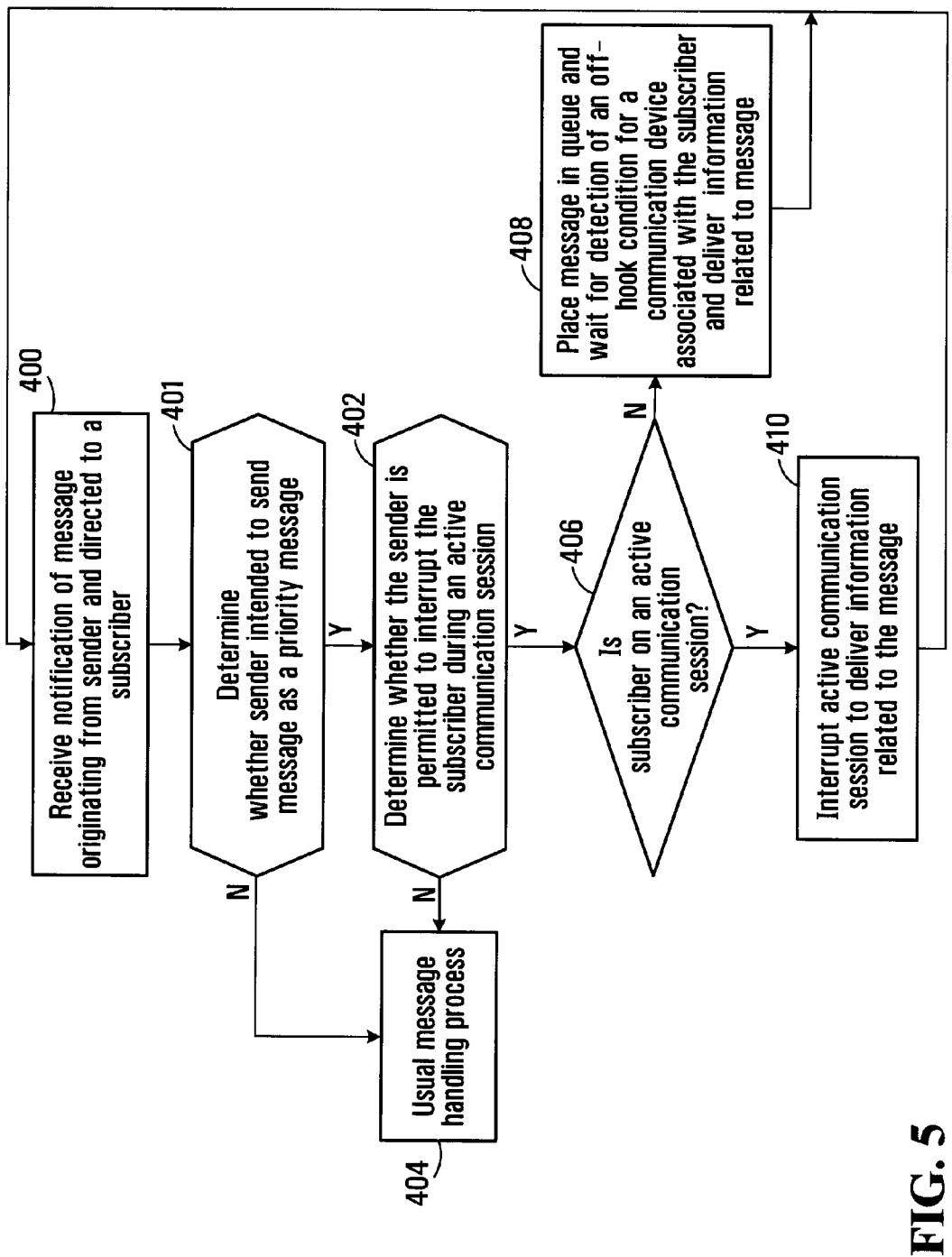
FIG. 5 shows an example of a process for delivering information to a subscriber in accordance with an embodiment of the invention.

It will be appreciated that the process depicted in FIG. 5 and implemented by processing unit 108 is repeated for each message received by the message mailbox 104 and directed to the subscriber of the message delivery service provided by the message delivery system 100 (shown in FIG. 1).

Returning to FIG. 1, as described in connection with the interrupt privilege database 106, the message delivery apparatus 102 may provide functionality for implementing an "interruption configuration function" accessible by the subscriber 150, this function allowing the subscriber to enter and/or modify conditions in the interrupt privilege database 106. Alternatively, such an "interruption configuration function" may be provided by a configuration entity (not shown in the figures) distinct from the message delivery apparatus 102, such configuration entity being in communication with the interrupt privilege database. The "interruption configuration function" may be accessible by the subscriber 150 through any suitable mechanism including for example the subscriber communication device 116 or some other electronic interface including for example a web-based interface. Manners for providing configuration functionality to a subscriber in relation to a telephony service are known in the art and any suitable mechanism may be used here. In a non-limiting example, a mechanism similar to that which may be used for entering information into an electronic address book may be used entering information in the interrupt privilege database 106.

Incoming Message Processing Entity 118

Returning to FIG. 1, the incoming message processing entity 118 implements suitable functionality for establishing a communication link with a sender communication device 120 for receiving, processing and storing the messages directed to the subscriber 150 in the message mailbox 104. Although the incoming message-processing entity 118 has been shown for the purpose of simplicity as being in direct communication with the sender communication device 120, processing entity unit 118 and the sender communication device 120 may be made over a communication network. Hence in such circumstances, the communication path between the incoming message-processing entity 118 and sender communication device 120 may include various network routing components such as switches, routers, gateways and computing nodes for example.

Systems and devices for receiving messages of the types described in the present specification are well known in the art and any suitable system may be used here in connection with the present invention. In a specific example, the incoming message processing entity 118 implements voice and/or video messaging functionality.

In a specific example of implementation, the incoming message processing entity 118 generates an entry in the message mailbox 104 for messages received from a sender. Preferably, each entry generated by the incoming message processing entity 118 is associated with sender identification data conveying information related to the sender of the message. The format of the entries may vary from one implementation to the other. Examples of such format were described above in connection with message mailbox 104 and FIG. 2. Optionally, each entry may also include an interrupt privilege password provided by the sender of the message. The interrupt privilege password may be provided by the sender in a number of different manners. For example, in the case where the message is in the form of an e-mail, the interrupt privilege password may be provided in the "Subject:" or "RE:" field of the e-mail. In the case where the message is a text message, the interrupt privilege password may be provided in a word or set of words of the text message.

Figure 6:
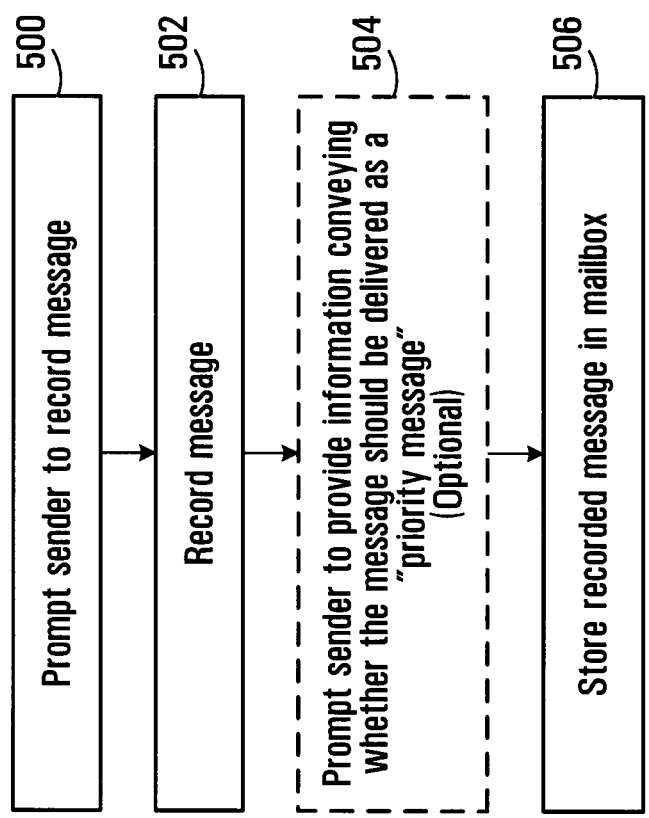
FIG. 6 shows an example of a process for receiving and storing messages originating from a sender in accordance with an embodiment of the invention.

In another example, where the message is a voice message, the password may be provided by the sender as a digital password entered during the process of recording the message by the voice message service, or alternatively, as a voice print. FIG. 6 of the drawings processing entity unit 118 in connection with a voice or video message.

As shown, at step 500, the voice message process is initiated whereby the incoming message processing entity 118 prompts the caller (sender) to record a voice/video message. It will be appreciated that the prompt at step 500 may be triggered by the caller (sender) 160 (shown in FIG. 1) attempting to establish a telephony session with the subscriber 150 (shown in FIG. 1) wherein the subscriber 150 is either already involved in another telephony session or is otherwise unavailable to respond to the caller (sender) 160. Alternatively, the prompt at step 500 may be triggered by the sender 160 initiating a process for sending a message to the subscriber 150 without attempting to establish a telephony session with the subscriber. In other words, the sender merely wishes to send a message to the subscriber without first attempting to establish a telephony session with the subscriber. In this alternative scenario, the sender may trigger processing entity unit 118 to initiate step 500 by entering a password, code or any other suitable information via the sender communication device 120.

At step 502, incoming message processing entity 118 records the voice/video message from the sender 160 in the conventional manner. Once the recording is completed the system proceeds to optional step 504 or to step 506 if step 504 is omitted.

At optional step 504, the incoming message processing entity 118 prompts the caller (sender) to indicate whether or not the voice/video message should be delivered to the subscriber in a priority manner (for example by interrupting an active telephony session or when an off-hook condition is detected in connection with a communication device associated with the subscriber). If the caller indicates that the voice/video message should not be delivered to the subscriber in a priority manner, the incoming message processing entity 118 identifies the voice/video message as a "non-priority message" and proceeds to step 506. If the caller indicates that the voice/video message should be delivered to the subscriber in a priority manner, the incoming message processing entity 118 identifies the voice/video message as a "priority message" and proceeds to step 506. Optionally, if the caller indicated that the voice/video message should be delivered to the subscriber in a priority manner, the incoming message processing entity 118 may further prompt the caller (sender) to provide an interrupt privilege password. In response to this further prompt, the caller may provide an interrupt privilege password or may refuse to do so. In this example, the interrupt privilege password may be provided in any suitable format including, without being limited to, a spoken utterance and a sequence of digits or DTMF tones provided on the communication device 120.

Alternatively, at step 504, instead of prompting the caller (sender) to indicate whether or not the voice/video message should be delivered to the subscriber in a priority manner, the incoming message processing entity 118 may prompt the caller (sender) to provide an interrupt privilege password. In response to this prompt, the caller may either provide an interrupt privilege password or may refuse to do so. By refusing to provide an interrupt privilege password, the caller (sender) would be implicitly identifying the voice/video message as a "non-priority message" while by providing an interrupt privilege password, the caller (sender) would be implicitly identifying the voice/video message as a "priority message". It will be readily appreciated that step 504 may be omitted from certain implementations without detracting from the spirit of the invention.

At step 506, the incoming message processing entity 118 stores the voice/video message in the message mailbox 104 (shown in FIG. 1) along with the caller (sender) identification information and (optionally) the interrupt privilege password provided at step 504.

Optionally, the message processing entity 118 may also store the voice/video message in the message mailbox 104 with information indicating whether or not the sender intended the message to be delivered to the subscriber in a priority manner ("priority message" v. "non-priority message"). The information indicating whether or not the sender intended the message to be delivered to the subscriber in a priority manner may be stored in association with the message in a priority message indication field.

Alternatively, messages identified as "priority messages" may be stored in message mailbox 104 (shown in FIG. 1) and messages identified as "non-priority messages" are stored in another message mailbox (not shown in the figures) distinct from message mailbox 104.

It is to be appreciated by the person skilled in the art that many variants on the incoming message processing entity 118 are possible and will be apparent to the person skilled in the art.

Although the incoming message processing entity 118 has been shown as a different component that the message delivery apparatus 102, it should be appreciated that the functionality of these devices 118 102 may be implemented by a same physical entity without detracting from the spirit of the invention.

Specific Physical Implementation

Those skilled in the art will appreciate that, in some embodiments, certain functionality of the message delivery system 100 (shown in FIG. 1) may be implemented as pre-programmed hardware or firmware elements (e.g., application specific integrated circuits (ASICs), electrically erasable programmable read-only memories (EEPROMs), etc.) or other related elements.

In other embodiments of the invention, all or part of the functionality previously described herein with respect to the message delivery system 100 may be implemented as software consisting of a series of instructions for execution by a computing unit. The series of instructions could be stored on a medium which is fixed, tangible and readable directly by the computing unit, (e.g., removable diskette, CD-ROM, ROM, PROM, EPROM or fixed disk), or the instructions could be stored remotely but transmittable to the computing unit via a modem or other interface device (e.g., a communications adapter) connected to a network over a transmission medium. The transmission medium may be either a tangible medium (e.g., optical or analog communications lines) or a medium implemented using wireless techniques (e.g., microwave, infrared or other transmission schemes).

Figure 7:
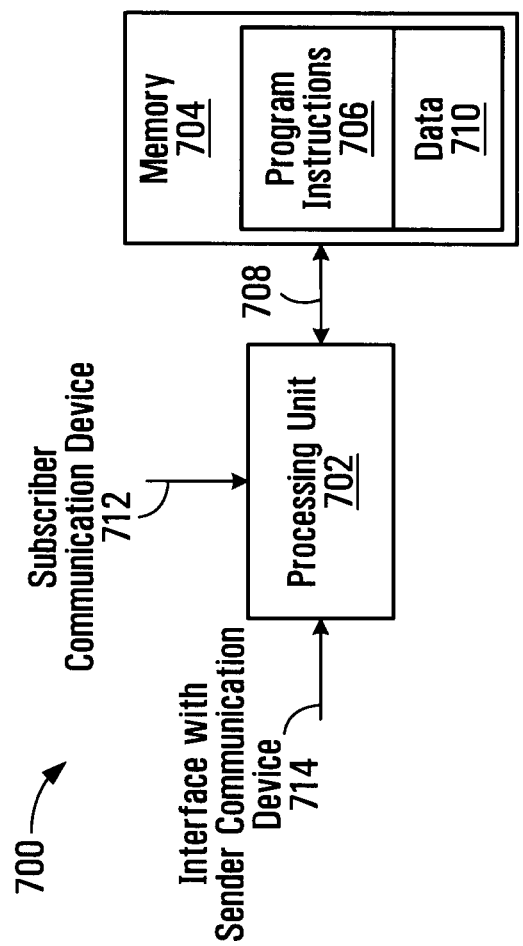
FIG. 7 shows a specific practical example of implementation of the message delivery system shown in FIG. 1.

The message delivery system 100 (shown in FIG. 1) may be configured as a computing unit 700 of the type depicted in FIG. 7, including a processing unit 702 and a memory 704 connected by a communication bus 708. The memory 704 includes data 710 and program instructions 706. In a specific example of implementation, the data 710 stored in memory 704 includes the interrupt privilege database 106 and the message mailbox 104 (shown in FIG. 1). The processing unit 702 is adapted to process the data 710 and the program instructions 706 in order to implement the functional blocks described in the specification and depicted in the drawings. In a non-limiting implementation, the program instructions 706 implement the functionality of the message delivery apparatus 102 (shown in FIG. 1) described above. The computing unit 700 may also comprise a number of interfaces 712 for receiving or sending data and or signals to external devices. For example, interface 712 is used for communicating with the subscriber communication device 116 (shown in FIG. 1) for delivering information thereto and interface 714 is used for communicating with the sender communication device 120 (shown in FIG. 1) for receiving messages originating therefrom.

Figure 8:
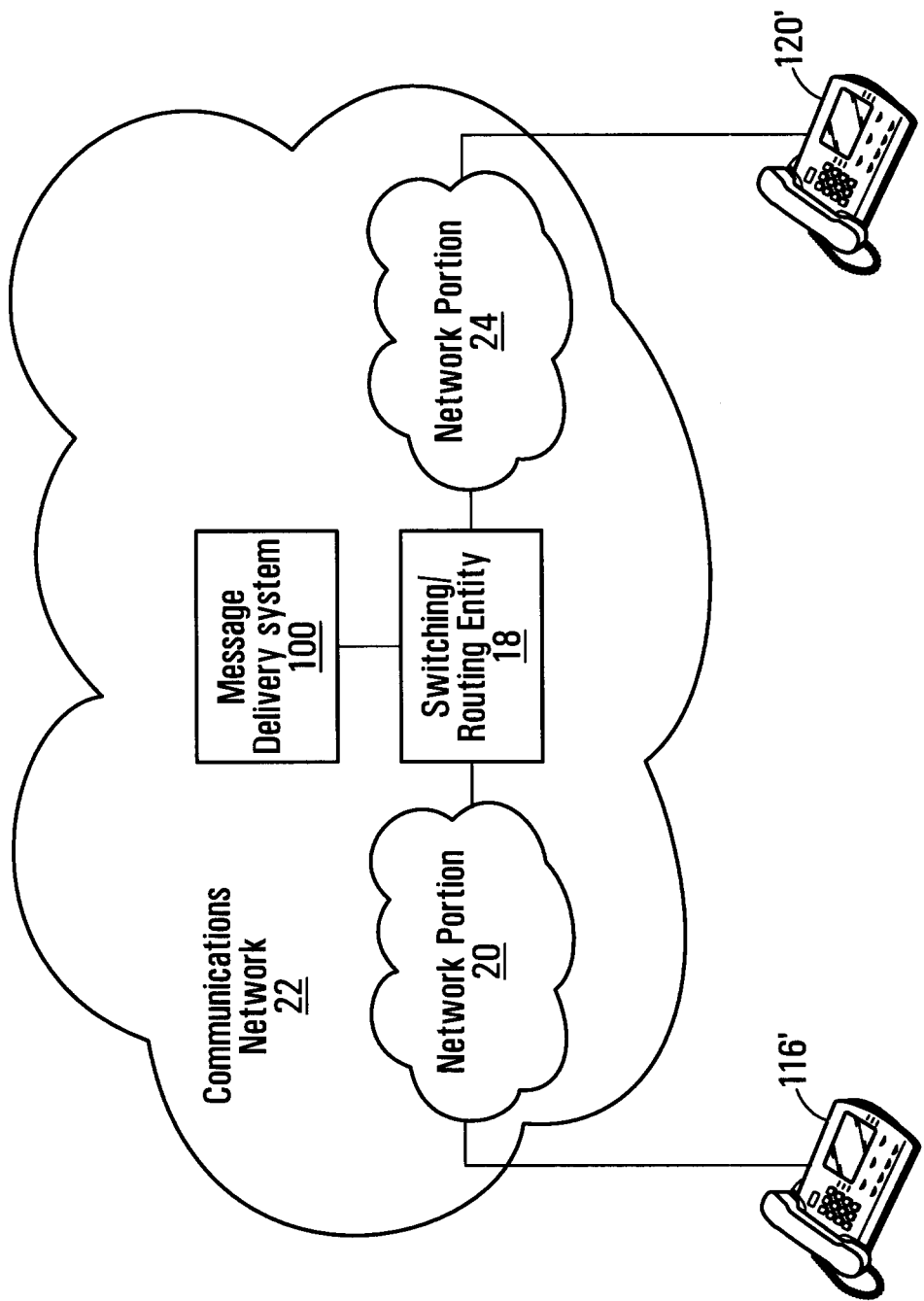
FIG. 8 shows a communications network including the message delivery system of FIG. 1 in accordance with an alternative example of implementation of the invention.

In a specific example of implementation, the message delivery system 100 (shown in FIG. 1) is a component of a communication network providing communication related services to subscribers. FIG. 8 shows an example of implementation of the message delivery system 100 embodied as part of a communications network 22.

As depicted, the subscriber communication device 116' in communication with message delivery system 100 through a switching/routing entity 18 via a network portion 20 of the communications network 22. The switching/routing entity 18 enables a subscriber communication device 116' to reach or be reached by any of various communication devices, such as sender communication device 120'. Similarly, the sender communication device 120' is connected to the switching/routing entity 18 via a network portion 24 of the communications network 22.

The communications network 22 may comprise a portion of one or more of the Public Switched Telephone Network (PSTN), a wireless network (e.g., a cellular network), and a data network (e.g., the Internet).

The nature of the network portion 20 and the switching/routing entity 18 will depend on the nature of the communication device 116' and where the switching/routing entity 18 resides in the communications network 22. For example, where the communication device 116' is a wired POTS phone and the switching/routing entity 18 resides in the PSTN, the network portion 20 may comprise a telephone line in the PSTN and the switching/routing entity 18 may be part of a central office switch. As another example, where the communication device 116' is a wireless phone and the switching/routing entity 18 resides in a wireless network, the network portion 20 may comprise a wireless link in combination with a base station and a wireline link, and the switching/routing entity 18 may be part of a mobile switching center. As yet another example, where the communication device 116' is a VoIP phone or an ATA-equipped POTS phone and the switching/routing entity 18 resides in a data network, the network portion 20 may comprise a digital communications link (e.g., a digital subscriber line (DSL) link, a cable link, or a wireless data link such as a WiMAX link) and the switching/routing entity 18 may be part of a softswitch or a router (e.g., an edge router or a core router). As yet another example, where the communication device 116' is a soft phone, the network portion 20 may comprise a digital communications link and the switching/routing entity 18 may be part of a server equipped with a modem. It will be appreciated that various other implementations of the network portion 20 and the switching/routing entity 18 are possible (e.g., where the communication device 116' is a telephony-enabled television unit). It will also be appreciated that the network portion 20 may span across different networks (e.g., PSTN, wireless, and/or data networks) in which case it may comprise one or more gateways enabling communication and interoperability between these networks. Such gateways are well known and need not be described in further detail.

Similarly, the nature of the network portion 24 will depend on the nature of the communication device 120' and where the switching/routing entity 18 resides in the communications network 22. Thus, the network portion 24 may comprise, for example, one or more of a telephone line in the PSTN, a wireless link in combination with a base station and a wireline link, a digital communications link, and one or more gateways enabling communication and interoperability between different networks.

The switching/routing entity 18 comprises suitable hardware, firmware, software, control logic, or a combination thereof for implementing a plurality of functional components, including an interface and a processing unit. The interface of the switching/routing entity 18 is adapted to receive and send signals over the network portions 20 and 24 to communicate with communication devices (such as the communication devices 120' and 116'). The interface of the switching/routing entity 18 is also adapted to allow interaction between the switching/routing entity 18 and one or more other network entities, including the message delivery system 100. The processing unit of the switching/routing entity 18 is adapted to effect various processing operations to implement that entity's functionality.

In a practical implementation, the functionality of the message delivery system 100 (shown in FIGS. 1 and 8) is implemented at a softswitch or packet-based application server. Such components are well-known in the field of VoIP telephony. For additional information related to such components, the reader is invited to refer to international PCT patent application entitled "A METHOD AND SYSTEM FOR ESTABLISHING A CONNECTION WITH A PACKET-BASED APPLICATION SERVER", filed on Dec. 21, 2007 in the Canadian Receiving Office, by Jonathan Allan Arsenault et al. The serial number of this application is not yet available. The contents of this document are incorporated herein by reference.

In such an implementation, the packet-based application server handles all incoming and outgoing calls between all the various communication devices irrespective of technology platform (i.e. PSTN, wireless or VoIP). In this way, the packet-based application server has full control over each established telephony session so that information related to a message may be bridged or injected into any active telephony session.

As described above with reference to FIG. 5, at step 410, which is initiated when the processing unit 108 determines that the subscriber is on an active telephony session, the processing unit 108 delivers information related to the message the subscriber by interrupting the active telephony session involving the subscriber.

In a first practical implementation using a packet-based application server, the server could implement that step by bridging-in information related to a message into an active telephony session between two parties, in effect forming a type of 3-way call. The party in the active telephony session who the message is not intended for can be muted before delivering the information related to the message to the intended recipient (the subscriber). In another example, it may be desirable that none of the parties are muted so that information related to the message is injected into the active telephony session to be heard (or seen in case of video information) by all parties in the active telephony session (sort of like a broadcast interrupt message). Optionally, the server could implement functionality for allowing for the subscriber to decide if he/she would like to listen to take the message. For example, the system could bridge into an active telephony session and inform the subscriber using a message of the type "Urgent Message from John Smith; press 1 to listen". If the subscriber decides to listen to the message, at that point they themselves could inform the other party (or parties) engaged in the active telephony session that they are going to take a message and will be temporarily leaving the active telephony session. After listening to the message, the subscriber can return to the active telephony session. Using the same scenario, the server could enable a special one-way tone to be played during an active telephony session indicating to the recipient that they have a message waiting to be heard. The recipient could then decide if he/she would like to listen to the message at that time.

In a second practical implementation using a packet-based application server, when the subscriber for who the message is intended is on an active telephony session with one or more other parties, the server could disconnect the subscriber from the active telephony session. The server may then deliver the information related to the message to the subscriber. After the information is delivered, the server may then reconnect the subscriber to the active telephony session with the one or more other parties involved in the active telephony session. In such an example, the other party is effectively placed "on-hold" or, in the case of multi-party calls (example a conference call involving the subscriber and two or more other parties), a telephony session may be maintained between the other parties while the subscriber is disconnect to deliver the information related to the message. Optionally, the server may send a notification to the one or more other parties involved in the active telephony session to warn them of the subscriber's temporary absence in order to take the message. Such a notification may be in a form such as "Please note that John is taking an urgent message").

It will be apparent that the above methods can easily be extended to active telephony sessions involving more than two parties (e.g. three way calls, conference calls).

In yet another possible implementation, the functionality of the message delivery system 100 (shown in FIG. 8) may be implemented in the PSTN domain. In such an implementation, the DMS switch may be configured with native or built-in functionality to enable such third party media injection in an active telephony session. Similarly, the functionality of the message delivery system 100 (shown in FIGS. 1 and 8) may be implemented a wireless equivalent module.

Although various embodiments of the present invention have been described and illustrated, it will be apparent to those skilled in the art that numerous modifications and variations can be made without departing from the scope of the invention, which is defined in the appended claims.

The invention claimed is:

1. A method for delivering information to a subscriber involved in a certain active telephony session, wherein the subscriber is a member of a certain subscriber group, said method comprising:
    a) receiving a message originating from a sender and directed to the subscriber, wherein the message is associated to sender identification data and includes content, the content of the message including at least one of a recorded voice message, a text message and a recorded video message;
    b) processing the sender identification data to determine whether the sender is a member of the certain subscriber group;
    c) determining whether the sender is permitted to interrupt the subscriber during an active telephony session at least in part based on whether the sender is a member of the certain subscriber group;
    d) when it is determined that the sender is permitted to interrupt the subscriber during an active telephony session, interrupting the certain active telephony session at least in part by causing information conveying at least a portion of the content of the message to be delivered to the subscriber during the certain active telephony session.

2. A method as defined in claim 1, wherein the content of the message includes a recorded voice message and wherein the sender is a caller.

3. A method as defined in claim 2, wherein said method comprises:
    a) allowing the caller to record a voice message directed to a subscriber;
    b) associating caller identification data to said recorded voice message.

4. A method as defined in claim 2, wherein the information conveying at least a portion of the content of the message caused to be delivered to the subscriber during the certain active telephony session is an audio representation of the recorded voice message.

5. A method as defined in claim 1, said method further comprising further processing said sender identification data based at least in part on an interrupt privilege database during said determining of whether the sender is permitted to interrupt the subscriber during an active telephony session.

6. A method as defined in claim 5, wherein the interrupt privilege database includes a plurality of entries, each entry being associated to at least one potential sender for use when determining whether the at least one potential sender is permitted to interrupt the subscriber during an active telephony session.

7. A method as defined in claim 6, wherein each entry in said plurality of entries maps at least one potential sender to a corresponding interrupt privilege level.

8. A method as defined in claim 7, wherein the interrupt privilege is selected from a set of possible interrupt privilege levels.

9. A method as defined in claim 5, wherein the interrupt privilege database is defined at least in part by the subscriber.

10. A method as defined in claim 5, wherein said interrupt privilege database includes a plurality of entries, at least one entry in said plurality of entries being associated to a group of potential senders comprising at least two potential senders, said method comprising processing said sender identification data to determine whether the sender is part of the group of potential senders when determining whether the sender is permitted to interrupt the subscriber during an active telephony session.

11. A method as defined in claim 1, wherein the certain active telephony session is an active voice call.

12. A method as defined in claim 1, wherein the certain active telephony session is an active video call.

13. A method as defined in claim 1, said method comprising determining that the sender is permitted to interrupt the subscriber during an active telephony session when the sender is member of the certain subscriber group.

14. A method as defined in claim 1, wherein the information conveying at least a portion of the content of the message is delivered to the subscriber during the certain active telephony session without being conveyed to another party involved in the certain active telephony session.

15. A method as defined in claim 1, wherein the content of the message includes a text message.

16. A method as defined in claim 15, wherein said method comprising:
   a) processing said text message to generate an audio synthesized representation of at least a portion of the text message;
   b) interrupting the certain active telephony session and causing the audio synthesized representation of the portion of the text message to be delivered to the subscriber.

17. A method as defined in claim 1, said method comprising:
   a) receiving an interrupt privilege password originating from the sender;
   b) performing said determining of whether the sender is permitted to interrupt the subscriber during an active telephony session further based at least in part on the interrupt privilege password.

18. A method as defined in claim 1, said method comprises causing information conveying at least a portion of the content of the message to be delivered to the subscriber during the certain active telephony session by:
   a) disconnecting from the certain active telephony session a communication device involved in the certain active telephony session, the communication device being associated with the subscriber;
   b) delivering the information conveying at least a portion of the content of the message to the subscriber through the communication device;
   c) reconnecting the communication device to the certain active telephony session.

19. A method as defined in claim 1, said method comprises causing information conveying at least a portion of the content of the message to be delivered to the subscriber during the certain active telephony session by bridging a message delivery system into the certain active telephony session.

20. A method as defined in claim 1, said method comprising causing information conveying at least a portion of the content of the message to be delivered to the subscriber during the certain active telephony session by bridging the information conveying at least a portion of the content of the message into the certain active telephony session.

21. A method as defined in claim 19, wherein the certain active telephony session involves the subscriber and at least one other participant, said method comprising muting the at least one other participant when the information conveying at least a portion of the content of the message is bridged into the certain active telephony session.

22. A method as defined in claim 1, wherein the information conveying at least a portion of the content of the message caused to be delivered to the subscriber includes audio information.

23. A method as defined in claim 1, wherein the information conveying at least a portion of the content of the message caused to be delivered to the subscriber includes video information.

24. An apparatus for delivering information to a subscriber involved in a certain active telephony session, wherein the subscriber is a member of a certain subscriber group, said apparatus comprising:
   a) a first interface suitable for receiving a message originating from a sender and directed to the subscriber, wherein the message is associated to sender identification data and includes content, the content of the message including at least one of a recorded voice message, a text message and a video message;
   b) a second interface suitable for communicating with a communication device associated with the subscriber, the communication device being involved in the certain active telephony session;
   c) a processing unit in communication with said first interface and said second interface, said processing unit being programmed for:
      i) receiving the message originating from the sender and directed to the subscriber;
      ii) processing the sender identification data to determine whether the sender is a member of the certain subscriber group;
      iii) determining whether the sender is permitted to interrupt the subscriber during an active telephony session at least in part based on whether the sender is a member of the certain subscriber group;
      iv) when it is determined that the sender is permitted to interrupt the subscriber during an active telephony session, interrupting the certain active telephony session at least in part by causing information conveying at least a portion of the content of the message to be delivered to the subscriber during the certain active telephony session.

25. An apparatus as defined in claim 24, wherein the content of the message includes a recorded voice message and wherein the sender is a caller.

26. An apparatus as defined in claim 25, wherein said processing unit is programmed for:
   a) allowing the caller to record a voice message directed to a subscriber;
   b) associating caller identification data to said recorded voice message.

27. An apparatus as defined in claim 25, wherein the information conveying at least a portion of the content of the message caused to be delivered to the subscriber during the certain active telephony session is an audio representation of the recorded voice message.

28. An apparatus as defined in claim 24, wherein said processing unit is programmed for further processing said sender identification data based at least in part on an interrupt privilege database during said determining of whether the sender is permitted to interrupt the subscriber during an active telephony session.

29. An apparatus as defined in claim 28, wherein the interrupt privilege database includes a plurality of entries, each entry being associated to at least one potential sender for use when determining whether the at least one potential sender is permitted to interrupt the subscriber during an active telephony session.

30. An apparatus as defined in claim 29, wherein each entry in said plurality of entries maps at least one potential sender to a corresponding interrupt privilege level.

31. An apparatus as defined in claim 30, wherein the interrupt privilege level is selected from a set of possible interrupt privilege levels.

32. An apparatus as defined in claim 28, wherein the interrupt privilege database is defined at least in part by the subscriber.

33. An apparatus as defined in claim 28, wherein said interrupt privilege database includes a plurality of entries, at least one entry in said plurality of entries being associated to a group of potential senders comprising at least two potential senders, wherein said processing unit is programmed for processing said sender identification data to determine whether the sender is part of the group of potential senders when determining whether the sender is permitted to interrupt the subscriber during an active telephony session.

34. An apparatus as defined in claim 24, wherein the certain active telephony session is an active voice call.

35. An apparatus as defined in claim 24, wherein the certain active telephony session is an active video call.

36. An apparatus as defined in claim 24, wherein said processing unit is programmed for determining that the sender is permitted to interrupt the subscriber during an active telephony session when the sender is member of the certain subscriber group.

37. An apparatus as defined in claim 24, wherein the information conveying at least a portion of the content of the message is delivered to the subscriber during the certain active telephony session without being conveyed to another party involved in the certain active telephony session.

38. An apparatus as defined in claim 24, wherein the content of message includes a text message.

39. An apparatus as defined in claim 38, wherein said processing unit is programmed for:
   a) processing said text message to generate an audio synthesized representation of at least a portion of the text message;
   b) interrupting the certain active telephony session and causing the audio synthesized representation of the portion of the text message to be delivered to the subscriber.

40. An apparatus as defined in claim 24, wherein said processing unit is programmed for:
   a) receiving an interrupt privilege password originating from the sender;
   b) performing said determining of whether the sender is permitted to interrupt the subscriber during an active telephony session further based at least in part on the interrupt privilege password.

41. An apparatus as defined in claim 24, wherein said processing unit is programmed for causing information conveying at least a portion of the content of the message to be delivered to the subscriber during the certain active telephony session by:
   a) disconnecting from the certain active telephony session a communication device involved in the certain active telephony session, the communication device being associated with the subscriber;
   b) delivering the information conveying at least a portion of the content of the message to the subscriber through the communication device;
   c) reconnecting the communication device to the certain active telephony session.

42. An apparatus as defined in claim 24, wherein said processing unit is programmed for causing information conveying at least a portion of the content of the message to be delivered to the subscriber during the certain active telephony session by bridging a message delivery system into the certain active telephony session.

43. An apparatus as defined in claim 24, wherein said processing unit is programmed for causing information conveying at least a portion of the content of the message to be delivered to the subscriber during the certain active telephony session by bridging the information related to the message into the certain active telephony session.

44. An apparatus as defined in claim 43, wherein the certain active telephony session involves the subscriber and at least one other participant and wherein said processing unit is programmed for muting the at least one other participant when the information conveying at least a portion of the content of the message is bridged into the certain active telephony session.

45. An apparatus as defined in claim 24, wherein the information conveying at least a portion of the content of the message caused to be delivered to the subscriber includes audio information.

46. An apparatus as defined in claim 24, wherein the information conveying at least a portion of the content of the message caused to be delivered to the subscriber includes video information.

47. A non-transitory computer readable storage medium including a program element suitable for execution by a computing apparatus for delivering information to a subscriber involved in a certain active telephony session, wherein the subscriber is a member of a certain subscriber group, said computing apparatus comprising:
   a) a memory unit;
   b) a processor in communication with said memory unit, said program element when executing on said processor being operative for:
      i) receiving a message originating from a sender and directed to the subscriber, wherein the message is associated to sender identification data and includes content, the content of the message including at least one of a recorded voice message, a text message and a video message;
      ii) processing the sender identification data to determine whether the sender is a member of the certain subscriber group;
      iii) determining whether the sender is permitted to interrupt the subscriber during an active telephony session at least in part based on whether the sender is a member of the certain subscriber;
      iv) when it is determined that the sender is permitted to interrupt the subscriber during an active telephony session, interrupting the certain active telephony session at least in part by causing information conveying at least a portion of the content of the message to be delivered to the subscriber during the certain active telephony session.

48. An apparatus for delivering information to a subscriber involved in a certain active telephony session, wherein the subscriber is a member of a certain subscriber group, said apparatus comprising:
   a) means for receiving a message originating from a sender and directed to the subscriber, wherein the message is associated to sender identification data and includes content, the content of the message including at least one of a recorded voice message, a text message and a video message;
   b) means for communicating with a communication device associated with the subscriber, the communication device being involved in the certain active telephony session;
   c) means for processing the sender identification data to determine whether the sender is a member of the certain subscriber group;
   d) means for determining whether the sender is permitted to interrupt the subscriber during an active telephony session at least in part based on whether the sender is a member of the certain subscriber group;
   e) means for interrupting the certain active telephony session at least in part by causing information conveying at least a portion of the content of the message to be delivered to the subscriber during the certain active telephony session when the means for determining determines that the sender is permitted to interrupt the subscriber during an active telephony session.

* * * * *